Dec. 17, 1968  SHIGERU NARUTANI  3,416,625
BUMPER ACTUATED SAFETY MEANS FOR ELECTRIC MOTOR DRIVEN CAR
Filed Oct. 10, 1966  2 Sheets-Sheet 1
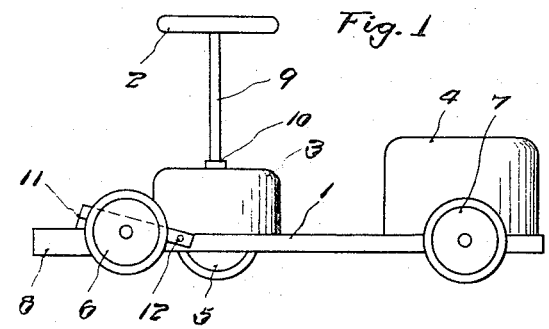
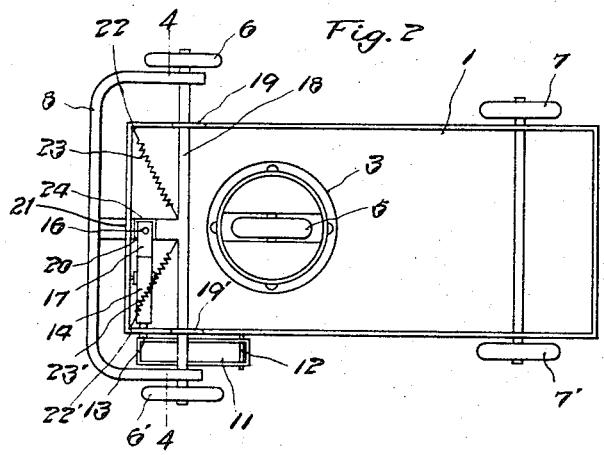
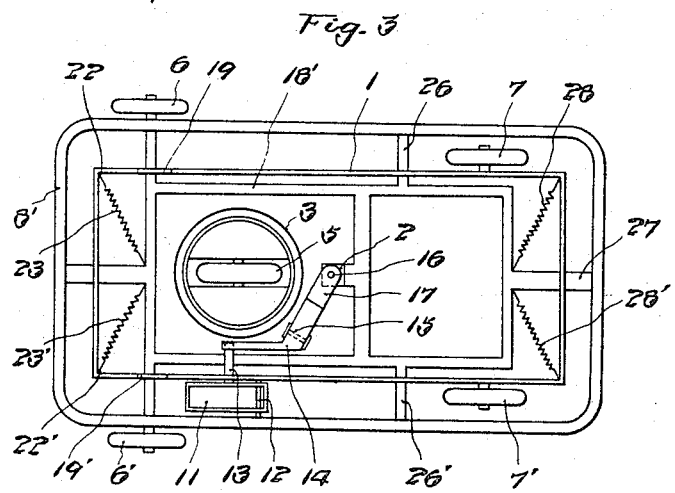

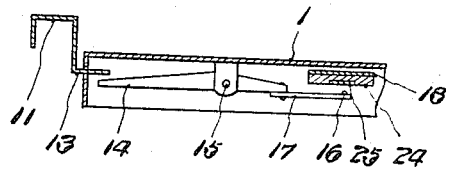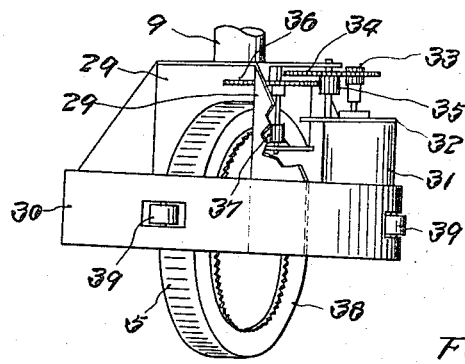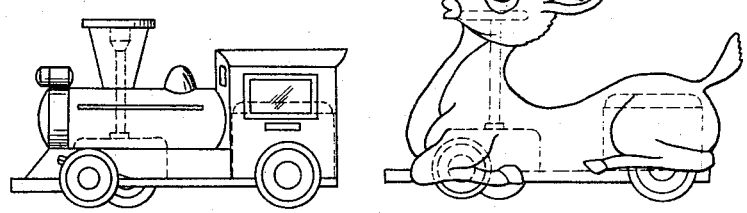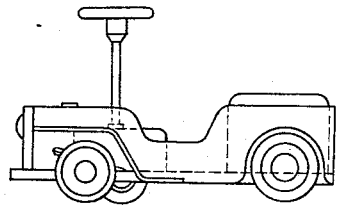

United States Patent Office 3,416,625
Patented Dec. 17, 1968

3,416,625
BUMPER ACTUATED SAFETY MEANS FOR
ELECTRIC MOTOR DRIVEN CAR
Shigeru Narutani, 430, 2–chome, Shimotakaido,
Suginami-ku, Tokyo, Japan
Filed Oct. 10, 1966, Ser. No. 585,336
Claims priority, application Japan, Oct. 15, 1965,
40/62,904
2 Claims. (Cl. 180—96)

ABSTRACT OF THE DISCLOSURE

The present invention relates to the child playing electric-driven car and comprises three wheels, one of which is a driving wheel being rotated by a handle wheel manually, and a pair of auxiliary wheels mounted on a bumper. The bumper is mounted on a chassis and elastically movable. A pedal switch is provided for closing the motor circuit. A safety switch is also provided for opening the motor circuit, when the bumper abuts an object. Both switches are series connected in the motor circuit.

---

The present invention relates to an electric motor-driven car for a child, which car allows easy operation with complete safety, and which car is especially devised, so as to minimize obstructions, which may be caused in the driving motor and in an electric circuit and in a switch.

Known electric motor-driven cars for children's play have several drawbacks; they require an expensive driving motor and because of a storage battery to be used as the electric source require a comparatively high electric current despite its low voltage; they also require current-capacity switches for the pedal and for hand operation which are expensive and often cause disturbances. Accordingly, such type of cars have been scarcely used, except on playgrounds, wherein the operation is well performed, because of frequent burning out of the driving motor, caused by a car collision. A magnet motor of high power output has become known to be fabricated at lowered costs, for use even with a dry battery. A demand is created for vehicles of the electric motor driven type for children's play at a low price.

It is one object of the present invention to provide a "child playing electric motor-driven car" which responds to the above requirements. The car permits forward and rearward movement, and a turn only by operation of the handle; in case of a collision, namely, if something exerts pressure to the car at its front, its side or in oblique direction, the circuit opens automatically to stop the motor with the result that a burning out of the motor is prevented; if the driving wheels sink into soft ground during their run, the car also stops automatically; if erroneously touched onto a pedaling switch the car never starts. The above automated equipment with a simplified mechanism permits the car with common use of one pedaling switch for operation. The present invention enables to eliminate several pieces of capacity switches for magnified current which switch is costly and often causes disturbances, accordingly, the present invention provides a great advantage avoiding disturbances with lowered costs.

With this and other objects in view which will become apparent in the following detailed description, the present invention will be clearly understood in connection with the accompanying drawings, in which:

FIGURE 1 is a side elevation of the child playing electric motor-driven car;

FIG. 2 is a bottom plan view of the car;

FIG. 3 is a bottom plan view of another embodiment of the car;

FIG. 4 is a section along the lines 4—4 of FIG. 2;

FIG. 5 is a perspective side view of the driving part of the car;

FIGS. 6, 7 and 8 are side elevations of different car bodies on a chassis.

Referring now to the drawings, and in particular to FIGS. 1 and 2, the car comprises a chassis 1 on which is a handle 2. A cover 3 of the driving part of the car is mounted on the chassis 1. Chair 4 is likewise secured to the chassis 1. A driving wheel 5 is set in the chassis which carries auxiliary wheels 6 and 6' and rear wheels 7 and 7' and finally a bumper 8. In the cover 3 of the driving part is disposed a motor and a speed reducer for driving the wheel 5 as more particularly shown in FIG. 5. A shaft 9 is supported by a bearing 10 secured to the cover 3 of the driving part, the handle 2 being secured to the top end of the shaft 9, which is operatively connected with a driving mechanism. The handle shaft 9 is rotatable together with the driving parts for rotation about an angle of 360 degrees. Therefore, even if the driving wheel 5 rotates, the car can run in any direction by the rotation of the handle 2, with a small radius of rotation. A flexible slip ring may serve as operative connection of the driving motor with a battery for the electric source.

A pedal switch 11, which serves the purpose of opening and closing, respectively, the circuit between the driving motor and the battery, is supported at one end by a shaft 12, and another end of the switch lever-action member 13, sitting in the chassis 11, contacts one end of a switch lever 14, as shown in FIG. 3. The switch lever 14, supported by a swing shaft 15, includes an elastic member 17 having electric contact 16 at its other end and is constantly pressing the pedaling switch 11 by means of a spring or the like.

Referring now to FIGS. 2 and 4, there are shown supporting wheels 6 and 6' which freely rotate at both sides of the bumper 8, and since the chassis 1 is supported by three wheels, the rear wheels 7 and 7' and the driving wheel 5, the auxiliary wheels 6 and 6' do not contact on the ground.

A T-shaped stay 18 of the bumper 8 passes freely through long slots 19, 19' and 21, respectively, provided in the front and at both sides of the chassis 1, and the bumper 8 is being pulled forwardly and it returns back to its original forward position, if a pressing force, which is applied, is removed after a movement from its original position upon being pushed in either direction, from the front, from an oblique direction and from either of both sides. which return movement is caused by coil springs 23 and 23' extending between a part of the stay 18 and both corners 22 and 22' of the chassis 1. An electric contact plate 25 is inserted into an insulation plate 24 covering the stay 18 and facing the electric contact 16. When the pedal switch 11 is stepped down, the contacts 16 and 25 engage each other, to close the circuit between the driving motor and the battery, whereby the movement of the car is initiated. Whereas, if the bumper 8 engages any object with any displacement in any direction, the circuit opens, even if the pedal 11 is stepped down, because the electric contact 25 moves away from the engaging position, thus causing the car to stop.

In case the driving wheel 5 falls into a pit, or sinks into soft ground, the auxiliary wheels 6 and 6' engage the ground and the bumper causes a displacement, with the result that the circuit opens, as well as in case the car contacts with some body, and thus there is no difficulty to stop the rotation of the motor, or for allowing excessive current.

During getting on and off the car, since the rider's weight causes an unbalance to either the right or the left of the driving wheel 5, the chassis 1 creates some inclination toward the weighted side resulting in a contact of the auxiliary wheel 6, or 6' of the same side, on the ground, and if erroneously pedaled on the switch 11, the car may move slightly but is safe against sudden starting, since the electric contacts 16 and 25 do not engage each other, so that the circuit remains open.

According to the present invention, as explained above, this arrangement protects the car driver and the mechanics, and furthermore, it does not require an individual switch for the individual purposes, which permits the manufacture of the car at lowered costs, which brings about a favorable situation for the present type of a vehicle.

Referring now to the embodiment disclosed in FIG. 3, designed for an increased safety, the chassis 1 is surrounded by the bumper 8', and only one switch is also used in this embodiment. In this case, the bumper 8' and the stay 18' is of a frame configuration, and the bumper 8' is entirely suspended by the chassis 1 by means of supporting part 26, 26' and 27 and is returned in position by a coil spring 28 and 28', and this mechanism permits the circuit to open by non-engagement of the electric contacts against a pushing force applied from any direction.

Referring now to FIG. 5, by example the driving part contained in the cover of the driving part is shown, in which the handle shaft 9 is connected onto a fork plate 29 and the lower part of which is opened in four directions and is secured by a reinforcing ring. A driving motor 31 is fixed onto the sub-chassis constructed by the bending of the aforesaid fork plate 29 at its side, and a pinion 33, fixed at the motor shaft, is in mesh with a crown gear 38, which is disposed at the side of the driving wheel 5, through two sets of speed reducing gears 34, 35, 36 and 37, whereby the power is transmitted from the motor 31 to the wheel through the reducing gears.

The lead wire of the motor 31 is fed out, through the handle shaft 9, to the outside of the driving part cover 3.

It is important, since the present invention relates to children's vehicles, to manufacture at lowest cost, and therefore, precision work is not required. In order to attain this purpose, various devices were involved in the present invention. Namely, in order to bring about a smooth handling of the vehicle by supporting the handle shaft only by means of the bearing 10. If pressure is exerted during the run of the vehicle, 3 or 4 freely rotatable rollers 39 are attached to the reinforcing ring 30, which slightly contact the inside face of the driving cover.

The present invention, although it is adapted as an electric motor-driven vehicle for a child, can be advantageously utilized for other purposes, such as a vehicle chair for a patient of a hospital, a baby-car and a loading car for use in a department store or in a market store, and for conveying a car at low speed to be used in a factory.

The reason for simplification in its appearance, derives from the fact that it is so designed, besides being usable as of the condition as indicated in FIG. 1, to install all imaginable things thereon, such as an automobile, a steam-train, an electric train, an airplane, universe-flying rocket, a ship, a weapon, an agricultural vehicle, a scooter, every species of animals such as a deer, an elephant, a dog etc.; these can be quite simply replaced. FIGS. 6, 7 and 8 disclose such embodiments. FIG. 6 shows a modification of a train which is loaded on the chassis and upper end of the chimney is the handle. FIG. 7 is exemplified as infant deer, and the head of the animal is the handle which is freely rotatable. FIG. 8 is an automobile of the "Jeep" type. Since these upper structures can be mass-produced at lowered cost from plastic materials or from metal sheets, the purchaser can enjoy every type of the vehicle if he purchases one car once, by the additional purchase of any upper structure, to be mounted on the same chassis.

The embodiments of the invention in which an exclusive property or privilege is claimed are defined as follows:

1. A child playing electric motor-driven vehicle of the three-wheel type, comprising
   a chassis,
   one driving front wheel and two supporting rear wheels,
   a bumper carrying two laterally spaced auxiliary wheels secured to the sides of said bumper, the lowermost surface portion of said auxiliary wheels being vertically spaced a distance from the lowermost surface portion of said driving wheel under normal operations,
   elastic means disposed between said bumper and said chassis and the latter supporting said bumper,
   means mounting said bumper for movement from its normal position to a retracted position upon abutting an object, said elastic means returning said bumper to its normal position from said retracted position upon removal of the force exerted against said bumper,
   a pedal-switch starting mechanism secured to said chassis,
   one set of electric contacts operatively disposed between said bumper and said pedal-switch-starting mechanism and in electrically conductive relationship when said bumper is in said normal position,
   an electric circuit including a motor and a source of energy for driving said motor,
   said electric circuit being opened and closed, respectively, in response to the movement of said bumper and the return of the latter to its normal position, and
   said electric contacts being wired such that when in electrically conductive condition they serve as pedaling switch and concurrently as a safety switch, in order to stop the car when said bumper is displaced from its normal position in case of abutment of said bumper with an object,
   and said auxiliary wheels engaging the ground and displacing said bumper from its normal position to thereby interrupt said electric circuit when said driving wheel enters a depression in said ground which has a depth greater than said distance.

2. The child playing electric motor-driven vehicle of the three-wheel type, as set forth in claim 1, which includes an upper car body detachably mounted on said chassis.

References Cited
UNITED STATES PATENTS

| | | | |
|---|---|---|---|
| 956,952 | 5/1910 | Emden et al. | 180—96 |
| 1,682,731 | 9/1928 | Austin | 180—96 |
| 1,772,220 | 8/1930 | Markey | 180—26 |
| 2,706,008 | 4/1955 | Voight | 180—26 X |
| 2,892,506 | 6/1959 | Slater | 180—26 |
| 3,099,326 | 7/1963 | Weigel et al. | 180—26 |

A. HARRY LEVY, *Primary Examiner.*

U.S. Cl. X.R.

180—26, 65, 52, 21